United States Patent [19]

Tanamachi

[11] Patent Number: 5,351,144
[45] Date of Patent: Sep. 27, 1994

[54] PLASMA ADDRESSED ELECTRO-OPTICAL DEVICE WITH NON-CONTINUOUS BARRIER RIBS

[75] Inventor: Shoichi Tanamachi, Kanagawa, Japan

[73] Assignee: Sony Corporation, Tokyo, Japan

[21] Appl. No.: 158,044

[22] Filed: Nov. 24, 1993

Related U.S. Application Data

[63] Continuation of Ser. No. 10,890, Jan. 29, 1993, abandoned.

[30] Foreign Application Priority Data

Feb. 4, 1992 [JP] Japan .................................. 4-47970

[51] Int. Cl.$^5$ ..................... G02F 1/1343; G09G 3/22; G09G 3/10; G11C 11/14
[52] U.S. Cl. ......................................... 359/54; 359/87; 345/60; 315/169.4; 365/116; 313/484
[58] Field of Search ................. 359/59, 87; 315/169.1, 315/169.4; 365/116; 313/484, 491; 340/784, 771; 345/60

[56] References Cited

U.S. PATENT DOCUMENTS

| | | | |
|---|---|---|---|
| 4,896,149 | 1/1990 | Buzak et al. | 365/11 G |
| 5,175,473 | 12/1992 | Kim | 315/169.4 |
| 5,214,521 | 5/1993 | Kwon et al. | 359/87 |
| 5,221,979 | 6/1993 | Kim | 359/87 |
| 5,229,685 | 7/1993 | Kim et al. | 313/484 |

FOREIGN PATENT DOCUMENTS

| | | |
|---|---|---|
| 0185115 | 6/1986 | European Pat. Off. . |
| 0325387 | 7/1989 | European Pat. Off. . |
| 2221996 | 9/1990 | Japan . |
| 65005 | 3/1972 | Luxembourg . |

Primary Examiner—William L. Sikes
Assistant Examiner—Ron Trice
Attorney, Agent, or Firm—Hill, Steadman & Simpson

[57] ABSTRACT

A plasma addressed electro-optical device comprising a first substrate having a plurality of first electrodes arranged substantially in parallel to each other on a major surface thereof; a second substrate opposed to the first substrate and having a plurality of second electrodes arranged substantially in parallel to each other on a major surface thereof; an electro-optical material layer positioned between the first and second substrates; and a discharge chamber formed between the electro-optical material layer and the second substrate and containing an ionizable gas. The second electrode has a plurality of barrier ribs periodically disposed thereon, and the first and second electrodes are so arranged as to be spaced apart in the vertical and horizontal directions, respectively. And each of the barrier ribs is substantially the same in width as the second electrode. Since the width of each electrode is reducible to be equal to that of the barrier rib, both definition and fineness can be enhanced in the device.

15 Claims, 5 Drawing Sheets

PLASMA ADDRESSED ELECTRO-OPTICAL DEVICE WITH NON-CONTINUOUS BARRIER RIBS

This is a continuation of application Ser. No. 08/010,890, filed Jan. 29, 1993, now abandoned.

BACKGROUND OF THE INVENTION

1. Field of the Invention

The present invention relates to a plasma addressed electro-optical device of a double layer structure comprising a plasma cell and an electro-optical cell such as a liquid crystal cell, and more particularly to a structure of barrier ribs disposed in a plasma cell serving as a discharge chamber.

2. Description of the Related Art

Figure 7:
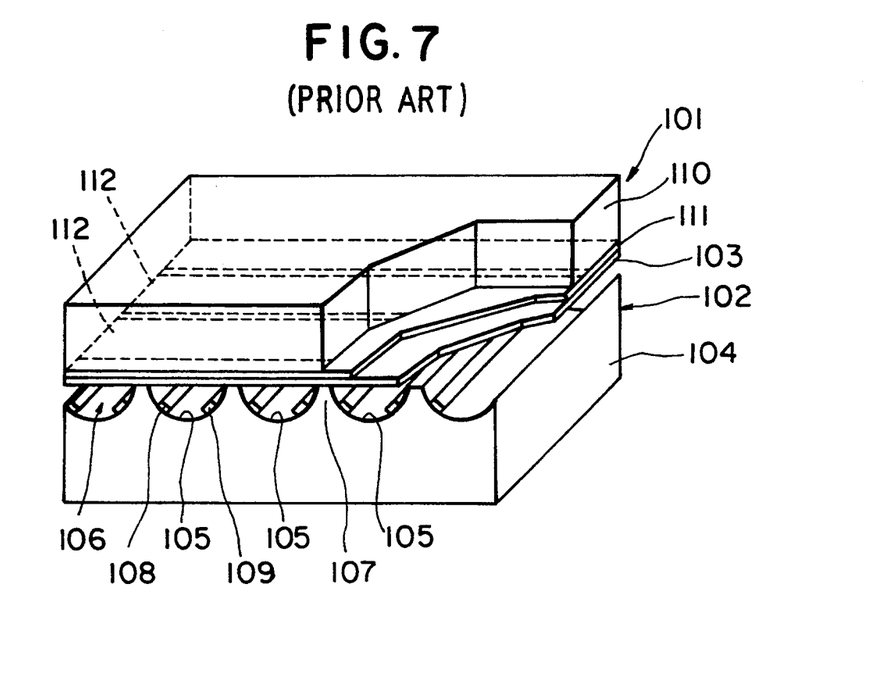
FIG. 7 is a perspective view of a conventional plasma addressed electro-optical device.

In a matrix type electro-optical device such as a liquid crystal display device using a liquid crystal cell as an electro-optical cell, there has been generally known heretofore that means for enhancing both the resolution and the contrast is realized by an active matrix addressing system which line-sequentially drives switching elements such as thin film transistors arranged correspondingly to individual picture elements. In this system, however, it is necessary to provide a multiplicity of semiconductor elements like thin film transistors on a substrate, so that if the device is designed to have a great area, there exists a disadvantage that the yield rate in manufacture is rendered lower. Relative to the means for solving such a drawback in the prior art, Buzak et al. proposed a system of utilizing plasma switches in place of switching elements which consist of thin film transistors or the like, as disclosed in U.S. Pat. Nos. 4,896,149 and 5,077,553 corresponding to Japanese Patent Laid-open No. Hei 1 (1989)-217396. Hereinafter a brief explanation will be given on the constitution of a plasma addressed display device which drives a liquid crystal cell by utilizing switches in accordance with plasma discharges. As shown in FIG. 7, this device has a laminated flat panel structure comprising a liquid crystal cell 101, a plasma cell 102 and a common intermediate sheet 103 interposed therebetween. The plasma cell 102 is formed by the use of a glass substrate 104, and a plurality of parallel channels 105 are formed in the surface of the plasma cell 102. The channels 105 extend in the direction of, e.g., rows in a matrix array and are sealed up by the intermediate sheet 103 in a manner to form plasma chambers 106 which are discrete individually. And an ionizable gas is filled in the plasma chambers 106 thus sealed up. A ridge 107 interposed between the mutually adjacent channels 105 serve as a barrier rib to partition the individual plasma chambers 106 while serving also as a gap spacer for the plasma chambers 106. A pair of mutually parallel plasma electrodes 108, 109 are provided in the bottom portion of each channel 105. Each pair of electrodes function as an anode and a cathode to generate discharge plasma by ionizing the gap in the plasma chamber 106. Such discharge region constitutes a row scanning unit.

Meanwhile the liquid crystal cell 101 is composed by the use of a transparent substrate 110. This transparent substrate 110 is disposed opposite to the intermediate sheet 103 through a predetermined gap retained therebetween, and a liquid crystal layer 111 is filled in the gap. On the inner surface of the transparent substrate 110, there are formed signal electrodes 112 composed of a transparent conductive material. The signal electrode 112 is orthogonal to the plasma chambers 106 and constitutes a column driving unit. And picture elements are defined in the form of a matrix at intersections of the column driving units and the row scanning units.

In the display device of the constitution mentioned, the plasma chambers 106 for generation of plasma discharges are line-sequentially switched and scanned, while an analog driving voltage is applied to the signal electrodes 112 on one surface of the liquid crystal cell in synchronism with such scanning to thereby perform driving for display. Upon generation of plasma discharge in the plasma chambers 106, the inside thereof is turned to the anode potential substantially evenly, and picture elements are selected row by row. In other words, the plasma chamber 106 functions as a sampling switch. When the driving voltage is applied to the picture elements during the on-state of the plasma sampling switch, a sample-and-hold operation is performed so that the turn-on or turn-off of each picture element can be controlled. And even after the plasma sampling switch is turned off, the analog driving voltage is still held in the picture element.

In the electro-optical device utilizing discharge plasma as mentioned above, it is considered that a greater effective area is realizable with facility in comparison with any device employing semiconductor elements. However, there still remain a variety of problems unsolved for practical use. For example, the provision of channels 105 for producing plasma chambers 106 on a substrate 104 of a glass material or the like causes considerable difficulties in manufacture, and it is extremely difficult in particular to form the channels 105 at a high density. Furthermore, the etching process for forming discharge plasma electrodes 108 and 109 in the channels 105 is complicated, and there exist some difficulties in attaining a high precision with regard to the space between each pair of electrodes 108 and 109.

OBJECT AND SUMMARY OF THE INVENTION

It is an object of the present invention to provide a plasma addressed electro-optical device having an improved structure where the width of each plasma electrode can be reduced by forming spaced noncontinuous barrier ribs periodically on the individual plasma electrodes.

According to one aspect of the present invention, there is provided a plasma addressed electro-optical device which comprises a first substrate having a plurality of first electrodes arranged substantially in parallel to each other on a major surface thereof; a second substrate opposed to the first substrate and having a plurality of second electrodes arranged substantially in parallel to each other on a major surface thereof; an electro-optical material layer positioned between the first and second substrates; and a discharge chamber formed between the electro-optical material layer and the second substrate and containing an ionizable gas. The second electrode has a plurality of barrier ribs periodically disposed thereon, and the first and second electrodes are arranged so that they are spaced apart in the vertical and horizontal directions, respectively. The discharge chamber is also termed a plasma cell or a plasma chamber. In this device, each of the barrier ribs is substantially the same in width as the second electrode. And the barrier ribs disposed on adjacent second electrodes have a pattern of stripes extended in a column direction.

According to another aspect of the present invention, there is provided an addressing structure comprising a substrate having a plurality of electrodes on a major surface thereof, each electrode having a plurality of barrier ribs periodically disposed thereon; a dielectric material layer opposed to the substrate; and an ionizable gaseous medium filled between the substrates and the dielectric material layer. In this structure, the barrier rib has an upper end which contacts the dielectric material layer, and both the second electrodes and the barrier ribs are formed by a printing procedure.

In the plasma addressed electro-optical device of the present invention, the barrier ribs are not continuous along the plasma electrodes and are spaced apart from each other periodically, so that the plasma electrodes are exposed in the space portions. And a plasma discharge is generated from the exposed portion between the mutually adjacent plasma electrodes, i.e., between the anode and the cathode. If the interval of the exposed portions is set to be smaller than the region of the plasma electrode generated locally, the plasma discharge regions are eventually rendered continuous along the arranged electrodes to attain execution of plasma addressing row by row. Therefore, differing from the prior art, it becomes possible to eliminate the necessity of setting the electrode width to be greater than the barrier rib width. In other words, the width of each electrode is reducible to be equal to that of the barrier rib to consequently realize enhanced definition and fineness.

The above and other features and advantages of the present invention will become apparent from the following description which will be given with reference to the illustrative accompanying drawings.

DETAILED DESCRIPTION OF TEE PREFERRED EMBODIMENTS

Hereinafter preferred embodiments of the present invention will be described in detail with reference to the accompanying drawings.

Figure 8:
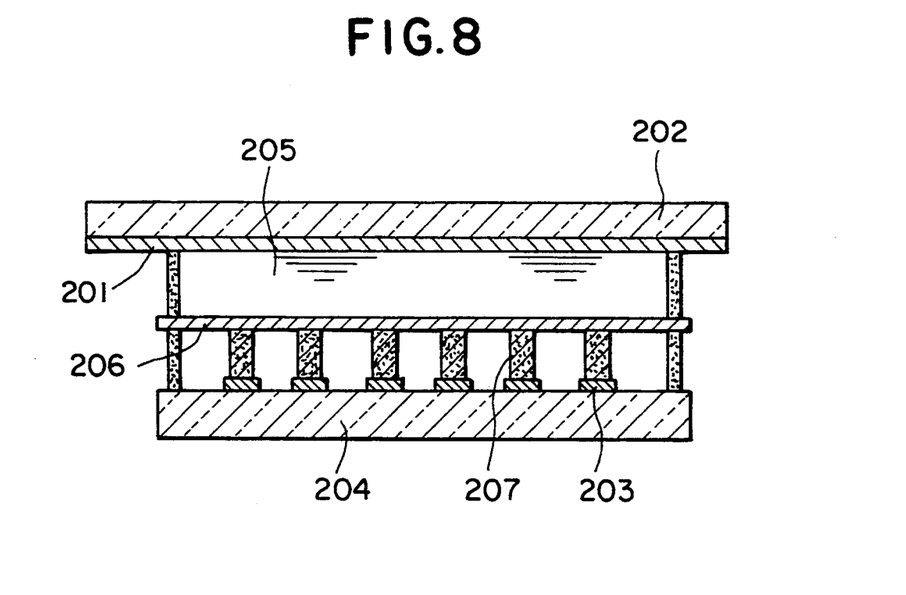
FIG. 8 is a sectional view of a plasma addressed electro-optical device disclosed in a prior application by the present applicant.
Figure 9:
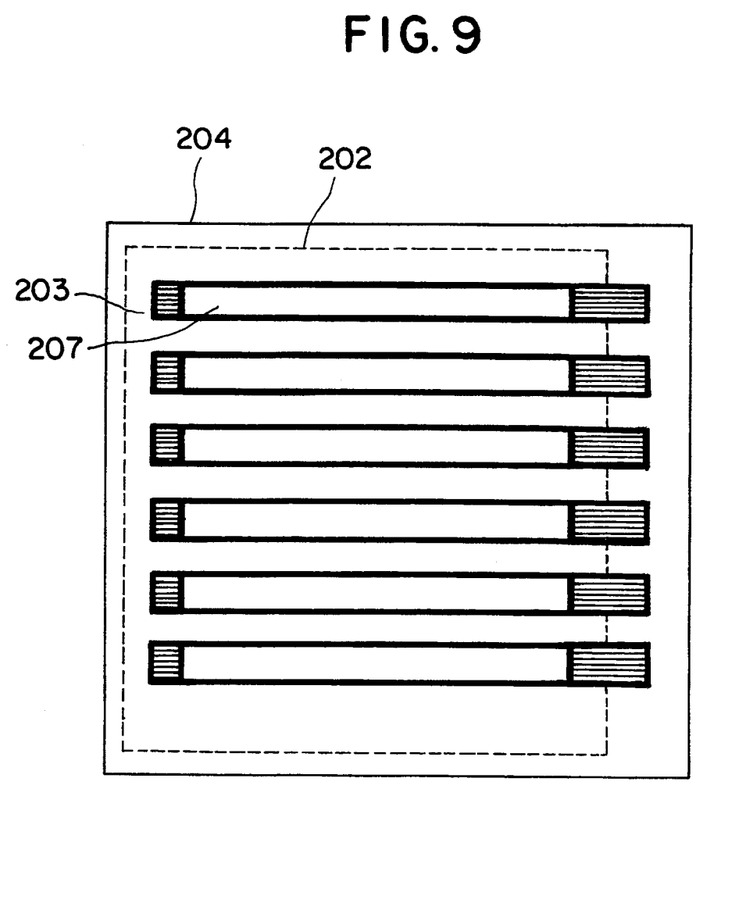
FIG. 9 is a plan view of the pattern of a lower substrate in the device of FIG. 8.

The following discussion with reference to FIGS. 8 and 9 is derived from U.S. Patent application Ser. No. 837,961 filed Feb. 20, 1992 (hereinafter referred to as Application 961) for providing the background of the present invention.

FIG. 8 is a sectional view of a plasma addressed electro-optical device manufactured by a printing procedure. This electro-optical device is disclosed in the Application 961 assigned to the assignee of the present application and corresponding to Japanese Patent Application No. Hei 3 (1991)-47784. This device comprises a first substrate 202 having a plurality of mutually parallel signal electrodes 201 on a major surface thereof, and a second substrate 204 having, on a major surface thereof, a plurality of plasma electrodes 203 which are virtually orthogonal to the signal electrodes 201 and are substantially parallel with each other. Such pair of substrates are disposed to be mutually parallel so that the signal electrodes 201 and the plasma electrodes 203 are opposed to each other. An electro-optical material layer 205 is interposed between the respective inner surfaces of the upper substrate 202 and the lower substrate 204. The electro-optical material layer 205 is isolated from the lower substrate 204 by means of an intermediate sheet 206 composed of a dielectric material, and an ionizable gas is hermetically filled in the space between the intermediate sheet 206 and the lower substrate 204 to form a discharge region, which is divided by barrier ribs 207 produced by printing procedure. The barrier ribs 207 serve to separate the electro-optical material layer 205 from the ionizable gas while supporting the intermediate sheet 206. In this device, therefore, the electro-optical material layer 205 and the intermediate sheet 206 are positioned between the respective inner surfaces of the lower substrates 204 and the upper substrate 202. Since the printing procedure is an extremely simple technique, the productivity and the operational facility can be remarkably enhanced in comparison with the art of forming channels. Furthermore, due to the structure where the plasma electrodes are formed on the flat substrate, the etching process can be simplified to consequently facilitate control of the interelectrode distance, whereby it is rendered possible to realize simple manufacture of an improved plasma addressed electro-optical device which is adapted for achieving a larger-sized screen and a higher definition. FIG. 9 is a plan view of the lower substrate 204 inclusive of the plasma electrodes 203 and the barrier ribs 207. In the structure where the carrier ribs 207 are formed on the plasma electrodes 203, it is necessary to set the width of each barrier rib to a value smaller than that of the plasma electrode and further to ensure an exact positional coincidence between the respective center lines of the carrier rib and the electrode. If this condition is not satisfied, generation of plasma discharge is rendered unstable to consequently bring about a failure in attaining the desired operating characteristics. Therefore, when forming the plasma electrodes and the barrier ribs by the art of screen printing procedure, the degree of fineness is dominated by the width of each barrier rib. And the portions furnished with the electrodes intercept the incident light passing through the plasma cell. Accordingly, for further enhancing the definition and the fineness of the electro-optical device, reduction of the electrode width is more advantageous. And if the electrode width can be sufficiently reduced, the rate of the electrode area to the entire display area is relatively raised to eventually increase the numerical aperture.

The present invention has an improved barrier rib structure so contrived as to reduce the width of the plasma electrodes by forming spaced noncontinuous barrier ribs periodically at fixed intervals on the individual plasma electrodes.

Figure 1:
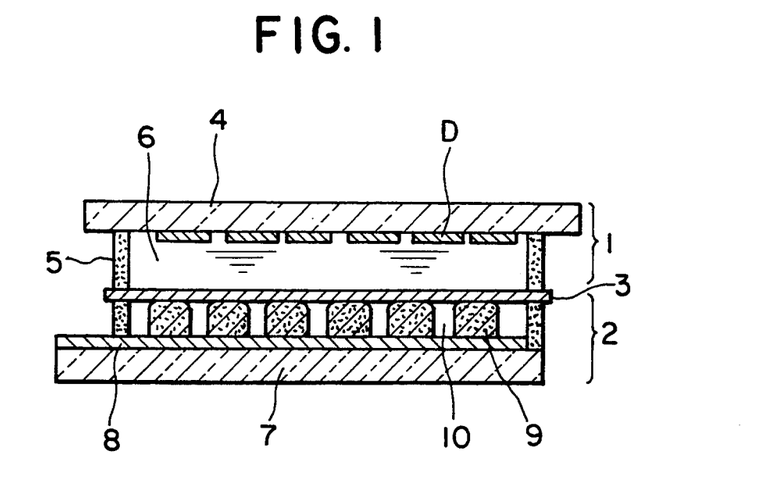
FIG. 1 is a typical sectional view of an exemplary embodiment representing the plasma addressed electro-optical device of the present invention taken along a row direction.

FIG. 1 is a typical sectional view of a first embodiment representing the plasma addressing display device of the invention taken in a row direction, i.e., along an array of plasma electrodes. This display device has a laminated structure of a liquid crystal cell 1, a plasma cell (discharge chamber) 2 and a common intermediate sheet 3 of a dielectric material interposed therebetween to serve as an isolating barrier for the plasma cell 2. The liquid crystal cell 1 comprises a first substrate 4 of glass, and a plurality of first electrodes serving as signal electrodes D, each composed of a transparent conductive film, are formed in parallel with each other on an inner major surface of the first substrate 4. The substrate 4 is joined to the intermediate sheet 3 through a predetermined gap by means of a spacer 5. And the gap is filled with a liquid crystal layer 6 composed of an electro-optical material. It is to be understood here that, although a fluid electro-optical material is used in this embodiment, the material is not limited thereto alone, and an electro-optical crystal sheet or the like may be employed as well. In this case, removal of the intermediate sheet 3 is rendered possible. It is further to be noted that the present invention is not limited to a plasma addressed display device represented by the embodiment and is widely applicable to a variety of plasma addressed electro-optical devices inclusive of an optical modulator and so forth.

Meanwhile the plasma cell 2 comprises a second substrate 7 of glass, and second electrodes or plasma electrodes 8 are formed on the inner major surface of the substrate 7 in a manner to be orthogonal to the signal electrodes D. And further barrier ribs 9 are formed in the row direction on the plasma electrode 8. The barrier ribs 9 are arrayed periodically with predetermined spaces 10 to constitute a noncontinuous structure, and the plasma electrodes 8 are partially exposed in the spaces 10. An upper end of each barrier rib 9 is kept in contact with the intermediate sheet 3 to serve also as a spacer.

Figure 2:
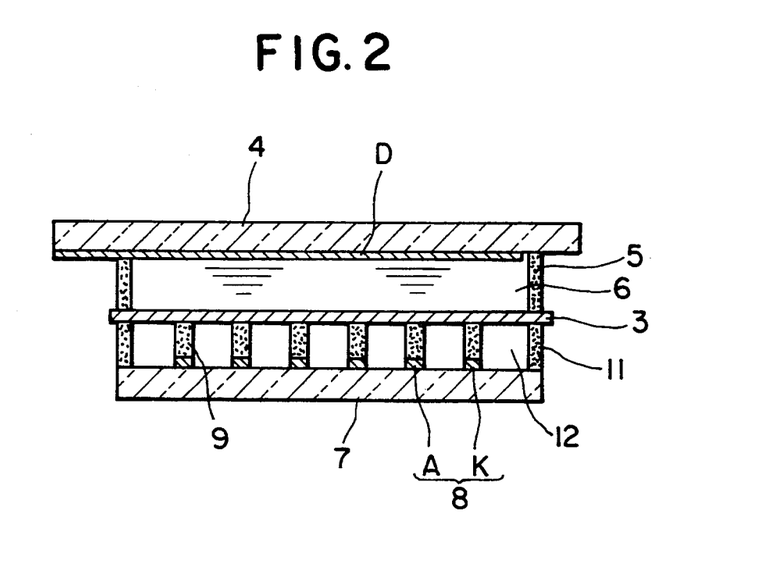
FIG. 2 is a sectional view of the same embodiment taken along a column direction.

FIG. 2 shows the same embodiment in a sectional view taken along the signal electrodes in the column direction. As described above, a plurality of plasma electrodes 8 are formed at predetermined intervals on the inner major surface of the second substrate 7, and each plasma electrode 8 functions as an anode A and a cathode K alternately. The plasma electrodes 8 are so disposed as to intersect with the signal electrodes 8. And the barrier ribs 9 are provided to be positionally coincident with the individual plasma electrodes 8 respectively. The width of each barrier rib 9 is substantially equal to that of the plasma electrode 8. In other words, the width of the plasma electrode 8 is reducible to be equal to the width of the barrier rib 9, since the surface of the plasma electrodes 8 can be partially exposed due to the noncontinuous structure of the battery ribs 9. The second substrate 7 is joined to the intermediate sheet 3 by the use of a seal member 11, and a plasma chamber 12 is formed therebetween hermetically. The plasma chamber 12 is partitioned by the noncontinuous carrier ribs 9 into discharge regions, each of which serves as a row scanning unit. The discharge regions communicate with one another through the spaces among the barrier ribs 9 to thereby constitute an open cell structure. Such hermetic plasma chamber is filled with an ionizable gas, which may be selected from, e.g., helium, neon, argon and a mixture thereof.

Figure 3:
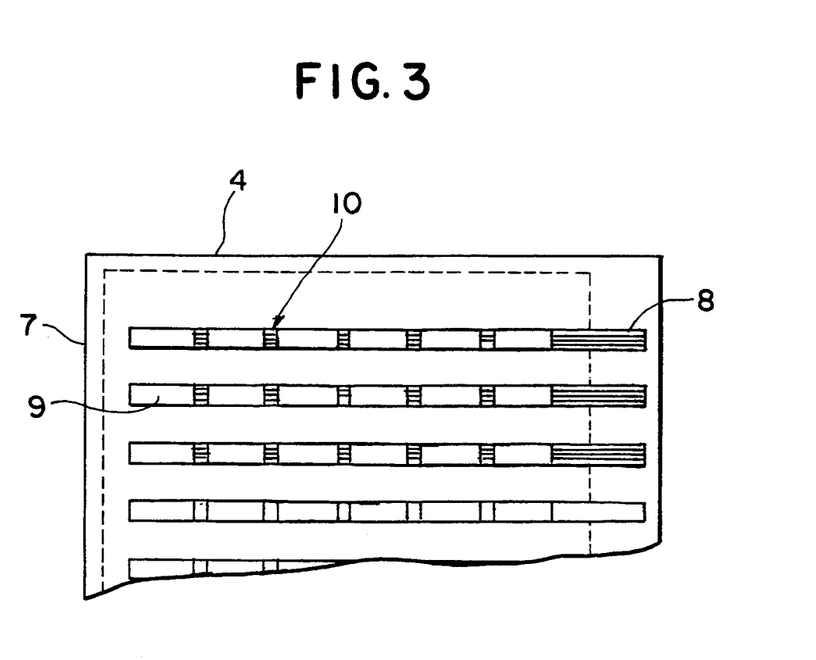
FIG. 3 is a partially cutaway plan view of a lower substrate employed in the embodiment of FIG. 1.

FIG. 3 is a plan view of the lower glass substrate 7. For the purpose of making the embodiment better understood with facility, the contour of the upper glass substrate 4 is denoted by a dotted line. As mentioned above, a plurality of plasma electrodes 8 extend on the surface of the substrate 7 along the row direction. Each of such electrodes 8 has a thick film electrode structure obtained by screen printing procedure to bake a printed glass paste which contains nickel or silver. And the barrier ribs 9 having a noncontinuous structure are superposed periodically on the plasma electrodes 8. The barrier ribs 9 are produced also by a screen printing procedure to bake a printed black glass paste or the like. And the plasma electrodes 8 thereunder are exposed in the spaces 10 among the noncontinuous barrier ribs 9. If the width of the barrier rib 9 is reduced to, e.g., 80 microns which is the maximum pattern precision attainable by the screen printing procedure, then it becomes possible to reduce the width of the plasma electrode 8 also to the maximum pattern precision.

When a voltage is applied to the mutually adjacent plasma electrodes 8 of which one serves as an anode while the other as a cathode, a plasma discharge is generated between the exposed portions of the electrodes. Therefore, if the interval between the exposed portions is set to be smaller than the expansion of the plasma, it follows that the plasmas are rendered substantially continuous in the row direction, whereby uniform plasma discharge regions can be obtained.

Figure 4:
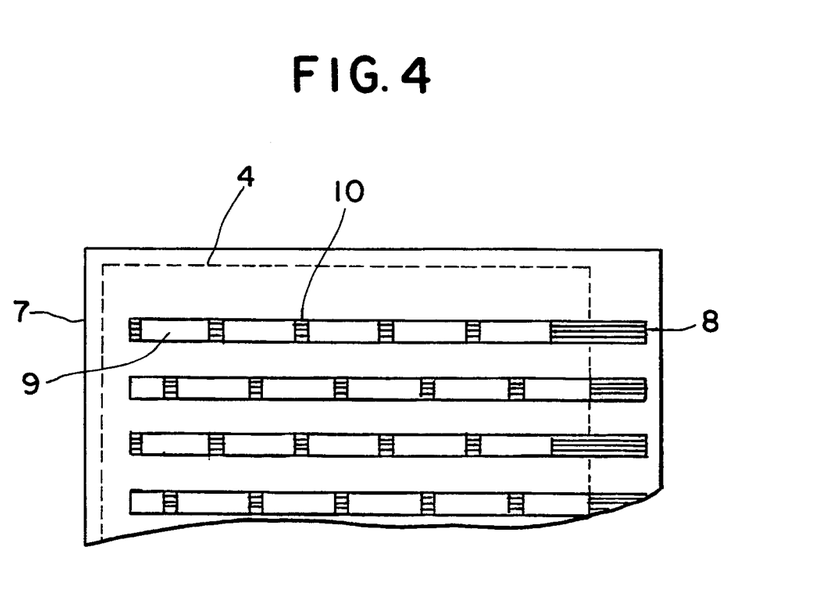
FIG. 4 is a partially cutaway plan view of a modification of the pattern shown in FIG. 3.

FIG. 4 illustrates a modification of the embodiment shown in FIG. 3, wherein any like components are denoted by like reference numerals to facilitate the understanding. Differing from the aforementioned embodiment of FIG. 3 where the spaces 10 among the individual barrier ribs 9 are aligned exactly in the column direction, the spaces 10 in the modification of FIG. 4 are shifted row by row in the column direction. Even in such constitution, a plasma discharge is generated between the shortest-distance exposed portions in a pair of plasma electrodes. In this modification where two mutually nearest exposed portions are existent, the area of the plasma discharge is widened. However, the distance between the two points in the exposed portions is longer in comparison with the foregoing example of FIG. 3, so that it becomes necessary to execute a proper adjustment by raising the driving voltage or selecting an adequate kind of the filled gas, or controlling the pressure thereof.

Now a theoretical explanation will be given below in an attempt to further clarify the present invention. In the structure of the aforementioned Application 961 shown in FIGS. 8 and 9, the barrier ribs on the electrodes are formed to be mutually continuous at least within the effective display area. However, the plasma state is not generated on a straight line between the cathode and the anode, but has a finite expansion relative to the pressure of the plasma gas. It is theoretically endorsed that the lower the gas pressure, the impingement probability is lowered to consequently widen the plasma region. Therefore, in forming striped plasma regions along the row direction, it is not necessary to expose the electrode surfaces in a striped pattern as disclosed in the Application 961. However, this is limited merely to the case of direct current plasma alone. In the structure of the present invention of FIG. 3 or 4 where the exposed portions of the electrodes are formed intermittently in consideration of the expansion of the plasma, it is still possible to produce striped plasma regions. Since the distance between the exposed portions of the cathode and the anode is different in the examples of FIGS. 3 and 4, it is naturally necessary to generate stable plasma by controlling the plasma gas pressure.

Thus the exposed portions of the electrodes need not be continuous with each other, and therefore the width of each electrode may be set equal to that of the barrier rib to meet the requirement, whereby an extremely fine electrode pattern can be formed to consequently achieve an enhanced resolution in display. In a plasma addressed display device, as in an ordinary liquid crystal display device, the intensity of the light transmitting through its panel is changed by an electro-optical means to execute significant visual representation. Accordingly, for further enhancing the efficiency of utilizing the incident light, it is necessary to minimize the area rate of the nontransparent electrodes having a light intercepting effect. In other words, the electrodes need to be as thin as possible. However, in the structure of the aforementioned Application 961 where each electrode is exposed over the entire length thereof, the width of the barrier rib becomes one factor of limitation in forming a thin-line pattern, and the electrodes that intercept the incident light are not considered to maximally utilize the technique of thin-line pattern formation by the art of screen printing procedure. Technically the maximum precision attainable is 80 microns for example. In view of the disadvantage mentioned, the present invention has a novel structure where the exposed portions of the electrodes are formed at regularly controlled intervals. In this structure, the limit width of the thin-line pattern is rendered common with respect to both the electrodes and the barrier ribs to eventually minimize the rate of the light intercepting area to the limit of the thin-line pattern forming technique, hence raising the efficiency of light utilization in comparison with the conventional value. Consequently it becomes possible to attain a higher definition in the display.

Figure 5:
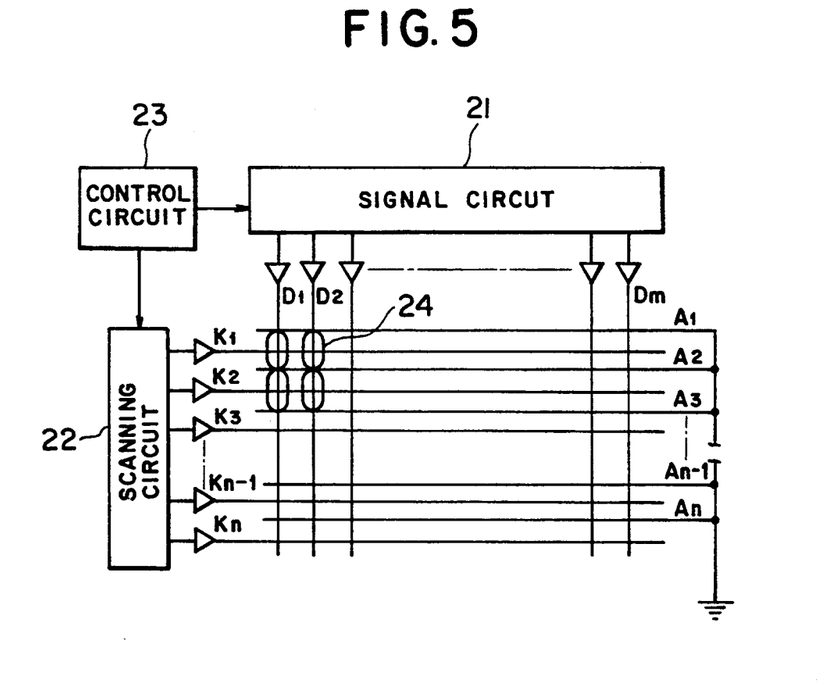
FIG. 5 is a block diagram of a driving circuit employed in the plasma addressed electro-optical device of the invention.

Referring finally to FIG. 5, the operation of the plasma addressed display device will be briefly described below. FIG. 5 shows an exemplary driving circuit employed in the display device. The driving circuit comprises a signal circuit 21, a scanning circuit 22 and a control circuit 23. Signal electrodes D1 – Dm are connected to the signal circuit 21 via buffers. Meanwhile cathode electrodes K1 – Kn are connected to the scanning circuit 22 via buffers similarly to the above, and anode electrodes A1 – An are grounded in common. The cathode electrodes are scanned line-sequentially by the scanning circuit 22, and the signal circuit 21 supplies an analog driving voltage to the signal electrodes in synchronism with such line-sequential scanning. The control circuit 23 controls the synchronization of the signal circuit 21 and the scanning circuit 22. Plasma electrode regions are formed along the cathode electrodes respectively to serve as row scanning units. Meanwhile the signal electrodes serve as column driving units. And picture elements 24 are defined between such two units. Since the anodes are grounded in common, the picture elements 24 are formed between the anodes positioned on both sides of the individual cathodes. It is to be understood here that the driving system is not restricted to the above example alone, and the anodes may be driven individually and separately.

Figure 6:
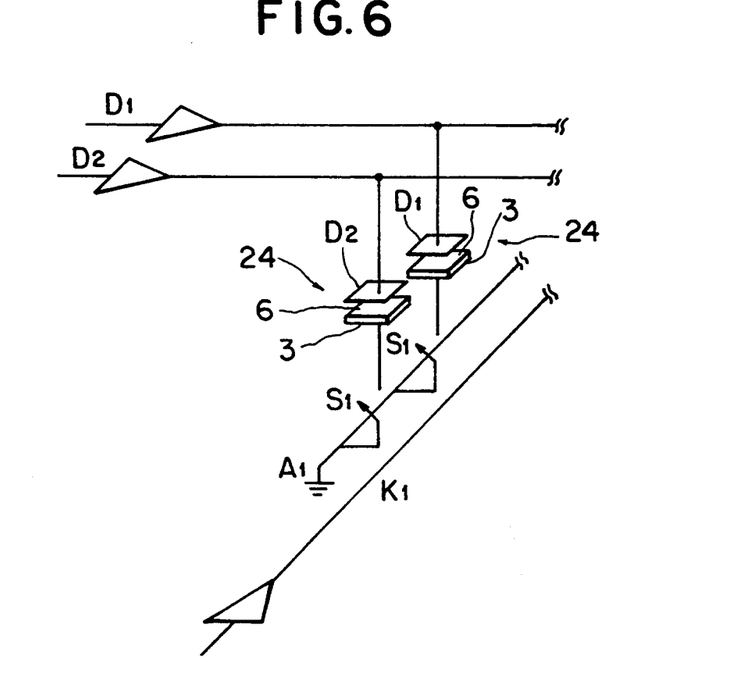
FIG. 6 is a typical diagram for explaining the operation of the plasma addressed electro-optical device of the invention.

FIG. 6 is a typical diagram showing two picture elements 24 extracted from FIG. 5. Each picture element 24 comprises a sampling capacitor consisting of a liquid crystal layer 6 held by a signal electrode D1 (D2) and an intermediate sheet 3, and a plasma sampling switch S1 connected in series thereto. The plasma sampling switch S1 in the diagram equivalently represents the function of a discharge region. More specifically, when the discharge region is activated, the inside thereof is connected substantially entirely to the anode potential. And upon termination of the plasma discharge, the discharge region is turned to the floating potential. The analog driving voltage is written in the sampling capacitor of the individual picture element 24 via the sampling switch S1 to thereby execute a sample-and-hold action. Thus, gradational turn-on or turn-off of each picture element 24 can be controlled in accordance with the level of the analog driving voltage.

As described hereinabove, the present invention has a novel structure where the barrier ribs are formed to be noncontinuous with one another on the individual plasma electrodes so that the electrode surfaces are exposed partially with spaces at equal intervals. Due to such a structure, the width of each electrode is reducible to be the same as that of the barrier rib to consequently achieve enhanced fineness with the maximal patterning precision attainable by screen printing procedure. Thus, there is ensured an advantage that the portions intercepting the incident light can be dimensionally reduced to realize a remarkable effect of contribution to a higher resolution in the electro-optical device.

What is claimed is:

1. A plasma addressed electro-optical device comprising:
   a first substrate having a plurality of first electrodes arranged substantially in parallel to each other on a major surface thereof;
   a second substrate opposed to the first substrate and having a plurality of second electrodes arranged substantially in parallel to each other on a major surface thereof, each said second electrode having a plurality of barrier ribs periodically disposed thereon, the first and second electrodes being arranged so that they are spaced apart in the vertical and horizontal directions, respectively;
   an electro-optical material layer positioned between the first and second substrates; and
   a discharge chamber formed between the electro-optical material layer and the second substrate and containing an ionizable gas.

2. A plasma addressed electro-optical device as claimed in claim 1, wherein each of said barrier ribs has much the same width as the second electrode.

3. A plasma addressed electro-optical device as claimed in claim 1, wherein said barrier ribs disposed on adjacent second electrodes have a pattern of stripes extended in a column direction.

4. A plasma addressed electro-optical device as claimed in claim 1, wherein said barrier ribs disposed on adjacent second electrodes have a pattern of stripes shifted every column in a row direction.

5. A plasma addressed electro-optical device as claimed in claim 1, wherein said electro-optical material layer is a liquid crystal layer.

6. A plasma addressed electro-optical device as claimed in claim 1, wherein said second electrodes are formed by a printing procedure.

7. A plasma addressed electro-optical device as claimed in claim 6, wherein said printing procedure is screen printing.

8. A plasma addressed electro-optical device as claimed in claim 6, wherein said barrier ribs are formed by a printing procedure.

9. A plasma addressed electro-optical device as claimed in claim 8, wherein said printing procedure is screen printing.

10. A plasma addressed electro-optical device as claimed in claim 1, further comprising an intermediate sheet of dielectric material disposed between the electro-optical material layer and the discharge chamber to form an isolating barrier between the electro-optical material layer and the ionizable gas.

11. A plasma addressed electro-optical device as claimed in claim 10, wherein each barrier rib has an upper end which contacts the intermediate sheet.

12. An addressing structure comprising:

a substrate having a plurality of electrodes on a major surface thereof, each electrode having a plurality of barrier ribs periodically disposed thereon;

a dielectric material layer opposed to the substrate; and an ionizable gaseous medium filled between the substrate and the dielectric material layer.

13. An addressing structure as claimed in claim 12, wherein each barrier rib has an upper end which contacts the dielectric material layer.

14. An addressing structure as claimed in claim 12, wherein said electrodes are formed by a printing procedure.

15. An addressing structure as claimed in claim 14, wherein said barrier ribs are formed by a printing procedure.

* * * * *